United States Patent

[11] 3,536,140

| | | |
|---|---|---|
| [72] | Inventor | Olin L. Looker<br>Milford, Illinois |
| [21] | Appl. No. | 722,950 |
| [22] | Filed | April 22, 1968<br>Division of Ser. No. 537,334, Mar. 25, 1966, now Pat. No. 3,387,611. |
| [45] | Patented | Oct. 27, 1970 |
| [73] | Assignee | FMC Corporation<br>San Jose, California<br>a corporation of Delaware |

[54] VINE CROP HARVESTER
1 Claim, 5 Drawing Figs.

[52] U.S. Cl................................................. 171/61,
56/327, 130/30
[51] Int. Cl.................................................. A01d 25/00
[50] Field of Search........................................... 56/1, 327,
328, 346; 171/61, 118; 130/30

[56] References Cited
UNITED STATES PATENTS

| Re. 19,672 | 8/1935 | Malcom et al................ | 171/61 |
| 1,200,937 | 10/1916 | Hannaford et al............ | 171/61X |
| 1,578,600 | 3/1926 | Greatrix....................... | 171/118 |
| 2,561,754 | 7/1951 | Propheter.................... | 56/128X |

*Primary Examiner*—Antonio F. Guida
*Attorneys*—Francis W. Anderson and C. E. Tripp ABSTRACT: A harvester for removing cucumbers or the like from green vines wherein, the vines and cucumbers are severed from the ground, and picked up by upper and lower undulating belts having loose projections that sweep the ground and feed the vines and attached cucumbers to snapper rolls.

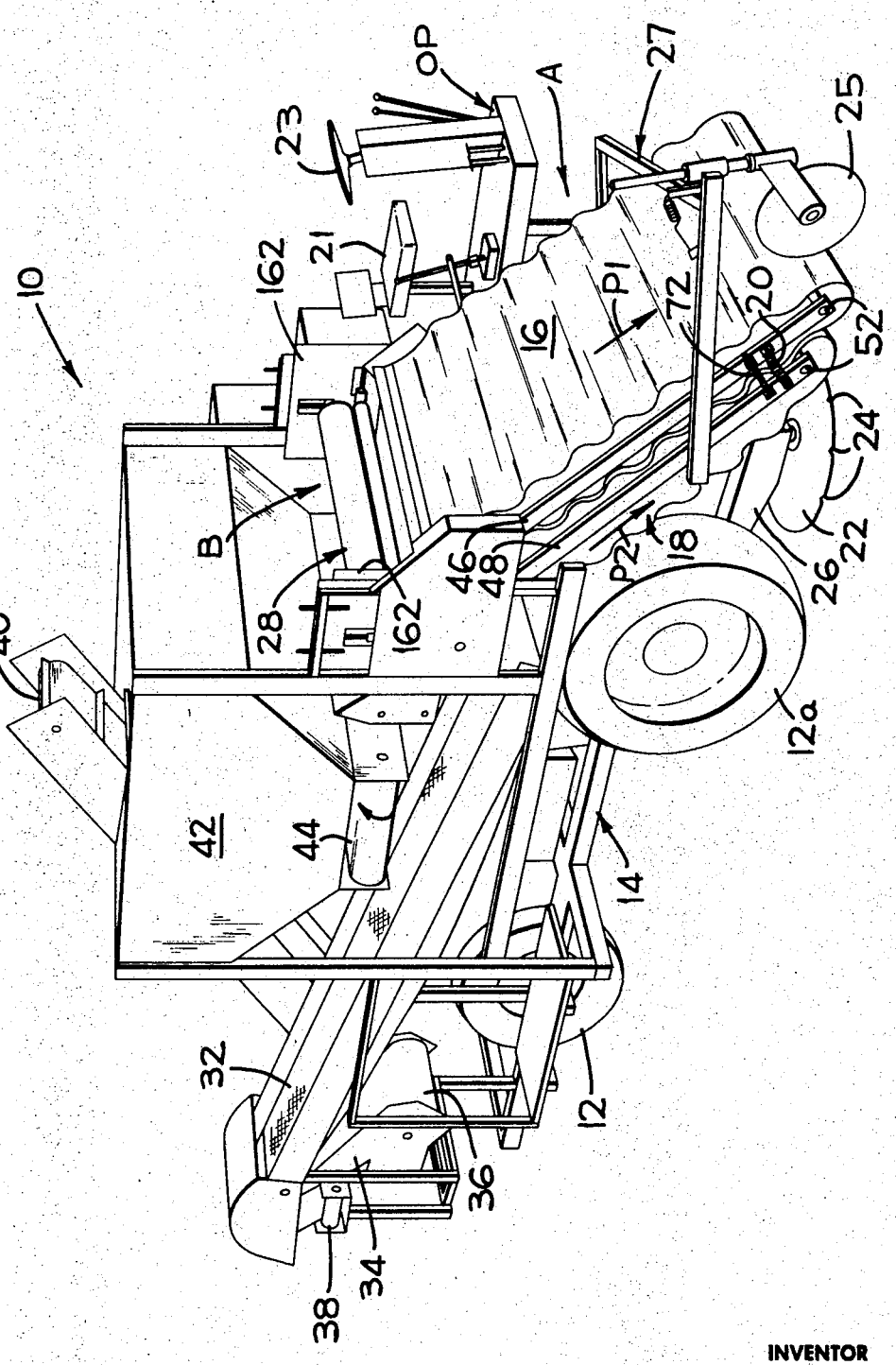

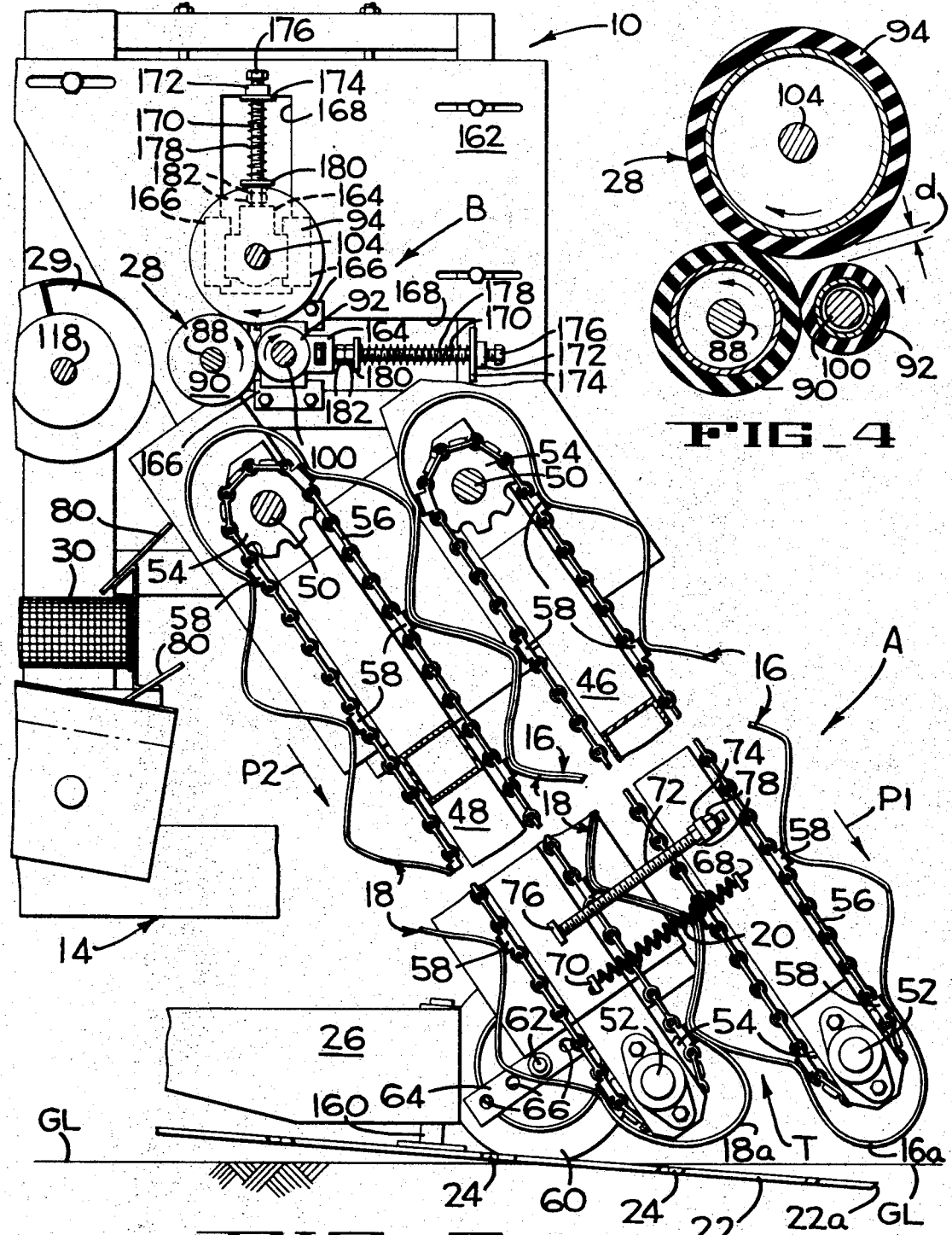

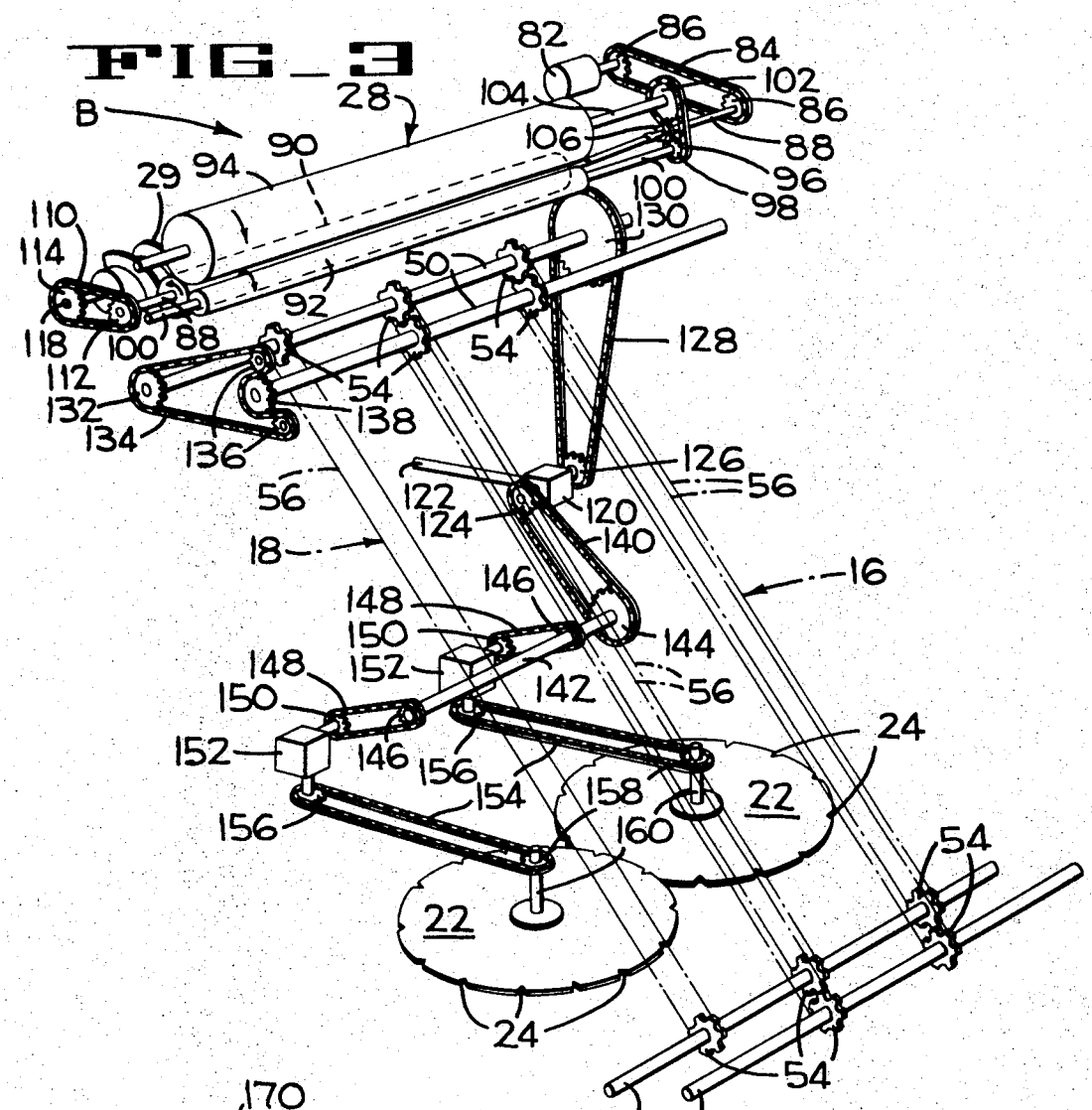

VINE CROP HARVESTER

This application is a division of my copending application Ser. No. 537,334, filed Mar. 25, 1966, now U.S. Pat. No. 3,387,611, issued June 11, 1968.

This invention relates to improvements in agricultural harvesting machines and more particularly to harvesters for vine-growing crops.

Due to the relative unavailability of domestic labor to economically perform hand harvesting of certain crops, increasing effort has been given to mechanizing harvesting of certain crops. This invention is an example of such an effort and it is particularly adapted to harvest vine-growing crops such as cucumbers which will tolerate rather rough treatment as compared to tomatoes, for example, which injure rather easily and are accordingly rendered useless for certain commercial purposes.

For further inventive features of the disclosed harvester reference should be made to the U.S. application of Glen R. Tillotson Ser. No. 540,002, filed Apr. 4, 1966, now U.S. Pat. No. 3,387,672, issued June 11, 1968 and the application of Russell J. Hurliman Ser. No. 537,470, filed Mar. 25, 1966, now abandoned. Both applications are assigned to the assignee of the present invention and they are incorporated herein by reference.

Although the invention will be described in connection with the harvesting of pickle-type cucumbers it is to be understood that it will perform equally well with other vine-type crops which do not injure very easily.

Under the invention of my parent application, a pressure roll engages one of the snapping rolls to augment the pull of the snapping rolls and to prevent wrap around of the vines, and a gap of certain dimension is provided between the pressure roll and the snapping roll.

The present invention relates to means for harvesting the vines and attached cucumbers and feeding them to the snapping rolls. A pair of downwardly slanting, undulating belts is provided. The belts run on horizontal axes and the upper belt extends past the lower belt so that projecting portions of both belt undulations sweep close to the ground for picking up the vines. Vine cutters are located below and ahead of the forward ends of the belts for vines below the ground line, before they are swept up by the belts.

Thus it is an object of this invention to provide an effective sweeping and pick up action on the severed vines. This is accomplished by the flexible, undulating pickup belts, described above.

This and other objects of this invention will become apparent from consideration of the following description in connection with the accompanying drawings, in which:

FIG. 1 is a perspective of the harvester employing the features of this invention, FIG. 2 is an enlarged fragmentary longitudinal offset section of the forward portion of the harvester shown in FIG. 1, FIG. 3 is a perspective of a drive train for actuating vine removing elements and pickle separating rollers, FIG. 4 is an enlarged vertical section of a portion of FIG. 2 showing the pickle removing rollers positionally related to fulfill the segregating function of this invention, FIG. 5 is a fragment of FIG. 2 showing the action of the pickle removing rollers as a vine passes therethrough.

In FIG. 1 there is shown a preferred form which the harvester of this invention may take in practice and it is generally indicated by the numeral 10. As is evident from this FIG. the harvester is self propelled by a rearward wheel 12 and a pair of forward wheels 12a (only one being shown) that are suitably rotatably mounted on axles supported on the main frame 14. Power from a suitable internal combustion engine (not shown) has its output connected to drive the forward wheels 12a. On the forward portion of the main frame, and positioned in a forwardly and downwardly extending position, there is a vine pickup mechanism A comprising an upper undulated flexible belt 16 and a lower belt 18 of a similar nature. These belts travel, respectively, in the direction of the arrows P1 and P2 so that the confronting reaches of each belt, that is to say the lower reach of the upper belt 16 and the upper reach of the lower belt 18, are in intimate contact and are held in such contact by a tension spring 20 in a manner which will be explained in greater detail hereinafter.

Mounted below the belts there is a pair of cutoff discs 22 (both of which are shown in FIG. 3) provided with circumferentially spaced triangular notches 24. These discs are rotatably carried by respective mounting assembmlys 26 which are in turn supported by the main frame 14. As the machine advances along a row of crops the discs 22 project under the ground line G.L., shown in FIG. 2, and sever the vines which are grasped and fed upwardly by the belts 16 and 18. An operators platform O.P., mounting a seat 21, a steering wheel 23, and various suitable controls, is located so that the operator is in full view of a guide wheel 25 pivotally mounted on a forwardly extending support frame 27.

The severed vines are carried upwardly to a separating mechanism B comprising a group of rollers 28 which serve to separate the product from the vines and are arranged to direct the stripped vines to a screw conveyor 29 (FIG. 2) which discharges the vines laterally of the machine and directs the severed pickles onto a conveyor for further processing. The product removed from the vines is deposited on a front cross conveyor 30 (FIG. 2) which discharges onto a rearwardly extending slightly upwardly inclined sorting and preliminary cleaning conveyor 32. The conveyor belt of conveyors 30 and 32 is made of loosely woven wire which permits dirt, sand and other foreign material to fall to the ground as the product is conveyed thereby.

At the terminal end of the conveyor 32 there is provided a duct 34 which directs high velocity air derived from a blower 36 onto the product. From the conveyor 32 the product is discharged to a rear cross conveyor 38 which transports the product laterally to an elevating conveyor 40 whose discharge end is located in the opening of a hopper 42 which accumulates the harvested product. The bottom wall of the hopper is defined by a lateral discharge conveyor 44 which is movable in the direction indicated by the arrow, to unload the hopper of accumulated product. In accordance with conventional forming practice it should be understood that the hopper can be unloaded into a truck while the harvester is continuing its advance along a row of crops.

Thus according to the above introductory description of this invention it is clear that the harvester cuts the vines by the rotating cutting discs 22 and moves them upwardly between the belts 16 and 18 to the separating mechanism B wherein the pickle is removed from the vines. At this point the vines are removed and discharged to the ground and the desired product is moved laterally by the front cross conveyor 30 to the rearwardly extending conveyor 32. Dirt and other farm material are in part removed while the product is on the conveyor 32 and remainder of such foreign material is removed when the product is transferred between the conveyor 32 to the conveyor 38 by a blast of air from the blower 36. The product is thence elevated upwardly and forwardly by the elevating conveyor 40 for accumulation in the hopper 42.

In accordance with one feature of this invention the belts 16 and 18 are mounted to assume an undulating or sinusoidal configuration and are timed such that the confronting surfaces of each belt are in intimate contact on the run which is traveling upwardly toward the separating mechanism B. Each belt is made of suitable reinforced flexible rubberlike material which is easily adapted to assume the undulating or sinusoidal shape. Each of the belts are mounted on generally rectangular frame structures 46 and 48, the upper and the lower frame structures respectively, which are suitably pivotally supported on the main frame of the machine. Each frame structure rotatably mounts longitudinally spaced transversely extending upper and lower shafts, 50 and 52 respectively, on which are secured sprockets 54. Trained about the sprockets of each frame structure there are endless chains 56 which carry regularly equally spaced mounting blocks 58. These mounting blocks are of a length substantially equal to the width of the belts 16 and 18. At regularly spaced intervals the belts are attached to these mounting blocks in any suitable manner and for example, they may be bolted to the mounting blocks, at intervals which allow the belt to assume the illustrated undulating shape. Due to the relative stiffness of the belting used the illustrated shape will be maintained. As will be explained in connection with the mechanism shown in FIG. 3 these belts are orbited in timed relation so that the undulations of the respective belts will register.

To support the frame structures 46 and 48 a desired distance above the ground there is provided a tire idler wheel 60 which is rotatably supported on an axle 62 mounted on a bracket 64 which is in turn rigidly connected to the lower frame structure 48. A series of holes 66 formed in a bracket 64 are provided so that the axle 62 may be mounted in any one of the holes in order to raise or lower the frame structures with respect to the ground line.

Means, which is the subject matter of the referenced application to Glen R. Tillotson, are provided between the frame structures 46 and 48 for biasing the frame structures toward each other and for adjusting the amount of such bias. Part of such means include the spring 20 which has its ends secured to small tabs or brackets 68 and 70 which are carried respectively by the frame structures 46 and 48. The amount of tension which is exerted by this spring 20 is determined by a threaded stud 72 which is slidably disposed through a bracket 74 mounted on the frame structure 46 and one of its ends is in abutting engagement with a stop bracket 76 rigidly connected to the frame structure 48. A pair of nuts 78 are threaded on the stud 72 and are located on either side of the bracket 74. By appropriately manipulating these nuts the distance between the frames 46 and 48, at least at their lower end, can be adjusted and of course the tension of the spring 20 can be varied. As the minimum distance between the frames 46 and 48 is increased by extending the bolt 72, although the tension on the spring 20 is increased, the vine gripping force on vines is decreased, once the end of bolt 72 rests on the abutment 76. By virtue of this construction, as the vines which are entrained between the belts 16 and 18 progress upwardly, the upper frame 46 may pivot in a counterclockwise direction as viewed in FIG. 2 about the axis of the shaft 50 against the bias of the spring 20. Such movement of the upper frame occurs when removed vines are drawn between the belts 16 and 18. This of course prevents the harvested pickle from being crushed while the force of the spring causes the belts to firmly grip the vine. It is to be noted that when the upper frame 46 pivots in the above mentioned manner the end of the threaded stud 72 is free to move out of contact with the abutment 76. A similar spring and stud arrangement is provided on the opposite lateral side of the frames 46 and 48.

In accordance with another feature of this invention the cutoff discs 22 are of sufficiently large diameter so that the cutting edge 22a is in advance of the throat T defined by the lower ends of the upper and lower belts 16 and 18. It will be noted that the cutoff discs 22 are angled so that the cutting portion of its orbit is below the ground line G.L. This of course allows the stalk of the vine to be cut from the root. By locating the cutting portion of the discs in advance of the throat T the severed vines are easily drawn between the belts 16 and 18. In addition as the belts round the lower sprockets 54 generally arcuate projections 16a and 18a are formed which are effective to sweep the cut vine into the throat. It will be noted in FIG. 2 that the spacing of belt mounting blocks 58 along the chains exceeds half the circumference of the lower pulleys 54. Thus the arcuate projections 16a and 18a project some distance clear of the sprocket pulleys 54 and their respective chains 56, and so the projections can act as sweepers.

Not only are the belts 16 and 18 exceedingly effective to pick up the vines cut by the cutting discs 22 but the tortuous and undulating path that the vines must traverse before they are conveyed to the separating mechanism B causes some of the pickles which are attached to the vine to be removed due to the reverse twisting which is performed by the undulations of the belts. The pickles which may be so removed are carried upwardly and the undulations of the lower belt 18 move them to the forward cross conveyor 30 which is associated with inclined vertically spaced baffles 80, the upper one of which directs all of the removed pickles to the conveyor 30 and the lower directs the pickles to the conveyor 32. If it should occur that the cutoff discs 22 fail to cut a vine from its root, and the vine is entrained between the belts 16 and 18, the forward motion of the harvester, in conjunction with the gentle shaking action of these belts, will oftentimes be sufficient to remove the plant from the ground either by breaking it from its root structure or pulling it out root structure and all. According to the above described feature of this invention it should be readily apparent a harvester has been provided which reliably extracts vines from the ground, whether it be by cutting or pulling, and preliminarily removes some of the crop from the vine before it is introduced to a mechanism which is peculiarly adapted to remove the crop from the vine.

Referring now to FIG. 3 there is shown the drive train for the separating mechanism B, which includes the group of rollers 28, and the drive train for the cutoff discs 22 and the belts 16 and 18. With regard to the drive train for the separating mechanism B there is provided a conventional hydraulic motor 82 driving a sprocket chain 84 trained about sprockets 86 one of which is connected to the output shaft of the motor and the other to a shaft 88 which drives the lower rearward snapping roll 90 rotating in a direction indicated by the arrow. The remaining rollers 92 and 94, the lower forward snapping roll and the upper pressure roll respectively, are driven by a sprocket chain 96 trained about a sprocket 98 mounted on a shaft 100 of the roller 92 and a sprocket 102 mounted on a shaft 104 of the roller 94. The chain 96 is in meshing engagement with a small sprocket 106 secured to the shaft 88. The direction in which the rollers rotate is indicated by the arrows. It will be evident in view of the above-described construction that output power of the hydraulic motor 82 causes simultaneous rotation of the three rollers by virtue of the described chain and sprocket arrangement. It has been found that there is a critical linear speed for the rollers 90, 92, and 94 in cucumber harvesting, as explained in the aforesaid application of Hurliman, Ser. No. 537,470. Also, the vine gripping surfaces of these rollers are formed of rubber, the properties of which are critical in cucumber harvesting, as explained and claimed in the aforesaid application of Tillotson 540,002.

The screw conveyor 29 is located behind the roller 90, and as stated, serves the purpose of disposing the stripped vines laterally of the machine as it advances along a row of crops. This screw conveyor is driven by another sprocket chain 110 trained about sprockets 112 and 114 which are mounted respectively on shafts 88 and 118. Accordingly whenever the rollers are in operation the screw conveyor is in operation.

The power train for driving the conveyors 16 and 18 and the discs 22 is also shown in FIG. 3. Power from the engine is transmitted to a gear box 120 by a shaft 122. On the outputs of the gear box there are mounted sprockets 124 and 126. By means of a sprocket chain 128, trained about the sprocket 126 and a sprocket 130 which is fixed to the upper shaft 50 of the lower conveyor 18, rotation of the shaft 50 is effected. Since the sprockets 54 are secured to the shaft 50 consequent orbital movement of the chains 56 takes place. On the opposite end of the shaft 50 which carries the sprocket 130 there is secured another sprocket 132 driving a sprocket chain 134 which is wrapped around idler sprockets 136 and a driving sprocket 138 which is fixed to the shaft 50 of the upper conveyor 16. Since the sprockets 54 are fixed to this last mentioned shaft driving of the conveyor chains 56 of the upper conveyor is also effected. As is evident by inspection of FIG. 3 it will be noted that the lower shafts 52 of the upper and lower conveyors 16 and 18 respectively carry idler sprockets 54 which are driven by the chains 56.

Driving of the cutting discs 22 is accomplished by a sprocket chain 140, driven by the sprocket 124, which drives a jack shaft 142 by virtue of its meshing engagement with a sprocket 144 carried by the shaft 142. At spaced intervals on the shaft 142 sprockets 146 are mounted for driving corresponding sprocket chains 148 which are trained about sprockets 150 carried by shafts of similar right angle drive units 152. Sprocket chains 154, driven by sprockets 156, drive sprockets 158 which are secured to the shafts 160 of each cutting disc 22 to thereby impart rotation thereto.

In view of the above described power train it is readily apparent that power from the engine transmitted to the gear box 120 by the shaft 122 is effective to cause simultaneous operation of the cutting discs and the upper and lower conveyor.

In the illustrated embodiment of this invention the separating mechanism B is arranged to remove the crop from the vine, to dispose of the stripped vine, and to direct the detached crop to a cleaning and collection hopper. This object is preferably fulfilled by providing rearward and forward snapping rollers 90, 92 respectively and an upper pressure roller 94 which rollers are positioned in a novel manner. The rollers are rotatably mounted in bearings supported on side frame members 162 (both of which appear in FIG. 1) which are in turn carried by structural members of the main frame 14. Since both ends of each roller 92 and 94 are mounted in an identical manner description of one will suffice for both. As shown in FIG. 2 the shaft 100 of the forward snapping roller 92, and the shaft 104 of the upper pressure roller 94 are mounted in bearings carried by slider blocks 164 which are slidably mounted in guideways 166. The guideways are suitably secured, preferably by illustrated bolts, to extend inwardly from the marginal edges of elongate rectangular openings 168 formed in the side frame member 162. To each of the bearing blocks there is attached an elongate threaded stud 170 slidably disposed through a bushing 172 attached to an outwardly extending plate 174 which is mounted on the side frame member 162. On the end of each stud 170 there is threaded a nut 176. A suitable compression spring 178 surrounds each of the threaded studs 170 and it is located between the plate 174 and a washer 180 which is seated against a pair of jam nuts 182. By virtue of jam nuts 182 and the washer 180 a predetermined preload can be applied to the spring 170 and this preload must be overcome before the roller 92 or 94 will slide in their respective guideways 166.

The operation of the above described roller set will be described in connection with FIG. 5. In this FIG. there is shown a pickle type cucumber carrying vine, that has been directed toward the snapping rollers 90 and 92 by the belts 16 and 18. The snapping rollers for a downwardly opening nip throat for the vines (FIGS. 4 and 5). Since the rollers are rotating in the indicated direction the vine which is fed toward their contact point is drawn upwardly through the rollers with the leading portion of the stripped vine being urged toward the screw conveyor 29 by the roller 94. Rollers 92 and 94 are free to be displaced against the bias of springs 178 in their respective guideways. As the vine passes through these rollers the pickles C are snapped off and are urged by the lower belt 18 toward the front cross conveyor 30. Due to the indicated direction of rotation of the rollers and the fact that the snapping rollers 90 and 92 must be in forceful contact, the upper pressure roller 94 can only establish rolling engagement with either one of the rollers 90 or 92. However in the illustrated preferred construction the upper roller 94 is in rolling pressure engagement with the rearward snapping roll 90. The pressure roller 94 spans the snapping rollers 90 and 92 and hence forms a generally triangular vine receiving pocket with the snapping rollers. As claimed in my parent application, and as illustrated in FIG. 5, vines entering the vine-receiving pocket formed by the three rollers are carried out between the rearward snapping roller 90 and the pressure roller 94, and a gap "d" (FIG. 4) is provided between the pressure roller and the forward snapping roller 92. The minimum dimension of this gap is merely one which prevents rubbing contact between these rolls. Thus, as an example, the minimum gap can be one-thousandth of an inch. The maximum dimension of the gap $d$ is three-eights of an inch and this is the gap which is provided in the preferred construction.

Although the best mode contemplated for carrying out the present invention has been herein shown and described, it will be apparent that modification and variation may be made without departing from what is regarded to be the subject matter of the invention as set forth in the appended claims.

I claim:

1. A machine for harvesting vine-type crops comprising a main frame, means supporting said main frame for advance along the ground, upper and lower conveyor frames mounted on the main frame and slanting downwardly and forwardly toward the ground, means for mounting belts on each of said conveyor frames comprising pulleys at the ends of each frame and tension members around said pulleys, the upper conveyor frame extending longitudinally past the lower conveyor frame for bringing the lower pulleys on each conveyor frame relatively close to the ground, flexible belts secured to said tension members at spaced points along the members to form undulations in the belts, the spacing of the points of attachment of the belts to said tension members exceeding about half the circumference of said lower pulleys to provide flexible, arcuate pulley surrounding projections as the belt undulations sweep around said pulleys, means for driving said belts in synchronism and in a direction to cause reaches of the belts running between the frames to move upwardly together, means for bringing the undulations on the reaches of said belts disposed between said frames into interfitting vine-gripping engagement, said flexible arcuate projections of both of said belt undulations sweeping close to the ground for picking up the vine crops, as the projections pass around said lower pulleys.